United States Patent [19]
Mackie

[11] Patent Number: 5,838,842
[45] Date of Patent: Nov. 17, 1998

[54] SELF-IMAGING WAVEGUIDE OPTICAL POLARIZATION OR WAVELENGTH SPLITTERS

[75] Inventor: David M. Mackie, College Park, Md.

[73] Assignee: The United States of America as represented by the Secretary of the Army, Washington, D.C.

[21] Appl. No.: 783,300

[22] Filed: Jan. 10, 1997

[51] Int. Cl.⁶ ...................................................... G02B 6/00
[52] U.S. Cl. .............................. 385/11; 385/29; 385/39; 359/489; 359/494
[58] Field of Search .................................. 385/11, 28, 29, 385/31, 39, 42–47, 14, 50; 359/489, 494, 495, 629, 639

[56] References Cited

U.S. PATENT DOCUMENTS 5,379,354   1/1995   Jenkins ........................................ 385/46
5,640,474   6/1997   Tayag ........................................... 385/43
5,689,597   11/1997  Besse ........................................... 385/43

Primary Examiner—Hemang Sanghaui
Attorney, Agent, or Firm—Paul S. Clohan, Jr.

[57] ABSTRACT

Two new techniques for the separation of orthogonally polarized light or light of 2 arbitrary wavelengths by use of a waveguide optical device, based on either 1) simultaneous crossed and barred 1-by-1 off-center self-imaging, or 2) out-of-phase self-imaging. Simultaneous crossed and barred 1-by-1 off-center self-imaging utilizes a waveguide optical polarization splitter having an input waveguide containing TE and TM, a multimode interference region, aligned so that TE and TM refractive indices are very different, and with the length set so that the polarization with the lower refractive index is bar self-imaged while the other polarization is cross self-imaged, an output waveguide containing polarization with higher refractive index, and another output waveguide containing the other polarization. Both of these methods may also be used to separate light of 2 arbitrary wavelengths. Out-of-phase self-imaging utilizes a waveguide optical polarization splitter having an input waveguide containing TE and TM, a 1-by-2 polarization-independent self-imaging power splitter, an intermediate waveguide of length $L_{par}$ containing TE and TM, an intermediate waveguide of length $L_{par}+2*L_{perp}$ containing TE and TM, a 2-by-2 self-imaging coupler, and output waveguide containing TE only, and an output waveguide containing TM only.

14 Claims, 6 Drawing Sheets

SELF-IMAGING WAVEGUIDE OPTICAL POLARIZATION OR WAVELENGTH SPLITTERS

BACKGROUND OF THE INVENTION

This invention pertains to the field of integrated optics and photonics. Applications include optical and electronic communications, antenna remoting, cable television, waveguide sensing, and control of phased array antennae.

Integrated-optic devices are made according to photolithographic and microfabrication techniques. This makes possible mass production, in the same way as for electrical integrated circuits. The most common electro-optic substrate materials for integrated-optic devices are the semiconductors gallium arsenide (GaAs) and indium phosphide (InP) and lithium niobate, a ferroelectric insulating crystal. Lithium niobate is a strong, easily polished nonhydroscopic crystal, with a good electro-optic coefficient. It also has low optical transmission loss.

The emerging field of integrated optical systems has generated a number of components analogous to those employed in electronic circuits. For example, there are devices for performing beam-splitting and/or recombination functions such as those shown in U.S. Pat. No. 5,410,625. There are devices for performing optical mixing, such as those shown in U.S. Pat. No. 5,475,776. And there are devices for performing signal routing, such as those shown in U.S. Pat. No. 5,428,698.

There are presently a number of waveguide techniques for the separation of orthogonally polarized light. One technique is power splitting followed by TE/TM mode filtering, which achieves good extinction ratios, but sacrifices half of the power. In addition, multiple fabrication steps are required. Another technique uses grating devices, but these devices do not achieve sufficient extinction ratios; the ratios are only on the order of 9–11 dB, compared to a desired 20 dB or more. A third technique utilizes directional couplers and Mach-Zehnder interferometers, which work well in theory, but have very tight tolerances. Good extinction ratios are very difficult to achieve repeatably, and difficult to maintain over wide temperature ranges, due to thermal expansion/contraction. In consequence, these types of devices generally require active compensation. Mach-Zehnder interferometers also introduce an undesirable phase difference between the TE and TM outputs. Finally, asymmetric y-branch devices and overlapping self-imaging devices work well, but require multiple fabrication steps and only work on certain materials. Generally, for the currently available techniques either the performance is inadequate or the fabrication is complicated and/or material restricted. The situation is similar for the separation of wavelengths.

BRIEF SUMMARY OF THE INVENTION

It is therefore the object of the present invention to provide three new techniques for the separation of orthogonally polarized light or light of 2 arbitrary wavelengths by use of a waveguide optical device.

Still other objects and advantages of the present invention will become readily apparent to those skilled in this art from the detailed description, wherein only the preferred embodiment of the present invention is shown and described, simply by way of illustration of the best mode contemplated of carrying out the present invention. As will be realized, the present invention is capable of other and different embodiments, and its several details are capable of modifications in various obvious respects, all without departing from the present invention. Accordingly, the drawings and descriptions are to be regarded as illustrative in nature, and not as restrictive.

These and other objects are achieved by providing three new techniques for the separation of orthogonally polarized light or light of 2 arbitrary wavelengths by use of a waveguide optical device, based on either 1) simultaneous 1-by-1 and 1-by-2 self-imaging, or 2) simultaneous crossed and barred 1-by-1 off-center self-imaging, or 3) out-of-phase self-imaging. Embodiment #1 (simultaneous 1-by-1 and 1-by-2 self-imaging) utilizes a waveguide optical polarization splitter having an input waveguide containing TE and TM polarized light, a multimode interference region, aligned so that the TE and TM refractive indices are very different, and with the length set so that the polarization with the lower refractive index is singly self-imaged while the other polarization is doubly self-imaged, an output waveguide containing the light polarized with higher refractive index, and two additional output waveguides each containing half the power of the waveguide containing the light polarized with the higher refractive index. The same architecture can be used for wavelength separation/combination. Embodiment #2 (simultaneous crossed and barred 1-by-1 off-center self-imaging) utilizes a waveguide optical polarization splitter having an input waveguide containing TE and TM polarized light, a multimode interference region, aligned so that the TE and TM refractive indices are very different, and with the length set so that the light polarized with the lower refractive index is bar self-imaged while the light with the other polarization is cross self-imaged, an output waveguide containing light polarized with a higher refractive index, and another output waveguide containing light with the other polarization. The same architecture can be used for wavelength separation/combination. Embodiment #3 (out-of-phase self-imaging) utilizes a waveguide optical polarization splitter having an input waveguide containing TE and TM polarized light, a 1-by-2 polarization-independent self-imaging power splitter, an intermediate waveguide of length $L_{par}$ containing TE and TM polarized light, an intermediate waveguide of length $L_{par}+2*L_{perp}$ containing TE and TM polarized light, a 2-by-2 self-imaging coupler, and output waveguide containing TE only polarized light, and an output waveguide containing TM only polarized light.

DETAILED DESCRIPTION OF THE INVENTION

Waveguide polarization or wavelength splitters are required for the following applications:
a) Polarization or wavelength diversity receivers for coherent communication;
b) Optical fiber sensing of electric or magnetic fields using the Faraday effect;
c) Optical power doubling.

The use of a waveguide optical device for the separation of light with orthogonal polarizations or arbitrary wavelengths will be extremely advantageous in the field of optical control and communications and will yield several advantages over currently available waveguide separation devices. The advantages of my inventive techniques are:
(a) Ease of Manufacture; devices can be manufactured in one step with no cladding and with reasonable tolerances.
(b) Good Performance; devices will have low loss and low polarization crosstalk.
(c) Environmental Insensitivity; devices will be insensitive to external environments.
(d) Small Size.
(e) Passive; No electric fields are required and there is no power consumption.
(f) Generally Implementable; any birefringent material for embodiments #1 or #2, or any material for embodiment #3, and most fabrication processes for embodiments #1, #2, and #3.
(g) Simplicity; especially so for embodiments #1 and #2.

EMBODIMENT #1

Figure 3:
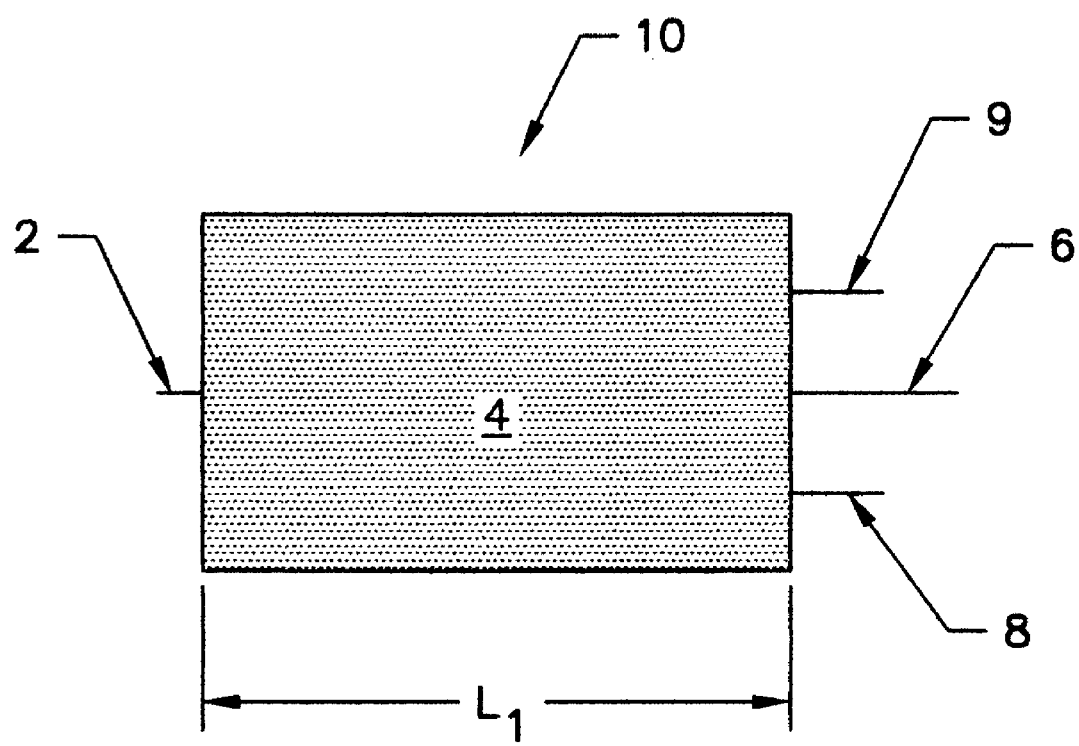
FIG. 3 is a schematic top view of embodiment #1 of my invention, a simultaneous 1-by-1 and 1-by-2 self-imaging waveguide optical polarization splitter in which, in general, p and q1.

Embodiment #1, a simultaneous 1-by-1 and 1-by-2 Self-Imaging Waveguide Optical Polarization Splitter 10, is shown schematically in FIG. 3. This integrated optical device consists of an input waveguide 2 containing TE and TM polarized light; a multimode interference region 4 aligned so that the refractive index for the TE polarized light is very different from the refractive index for the TM polarized light, and with the length $L_1$ of region 4 set so that the light polarization mode experiencing the lower refractive index in region 4 is singly self-imaged while the light having the other polarization mode is doubly self-imaged; an output waveguide 6 containing the light polarization mode experiencing the higher refractive index, and two output waveguides 8 and 9 each containing half the power of waveguide 6.

Figure 1:
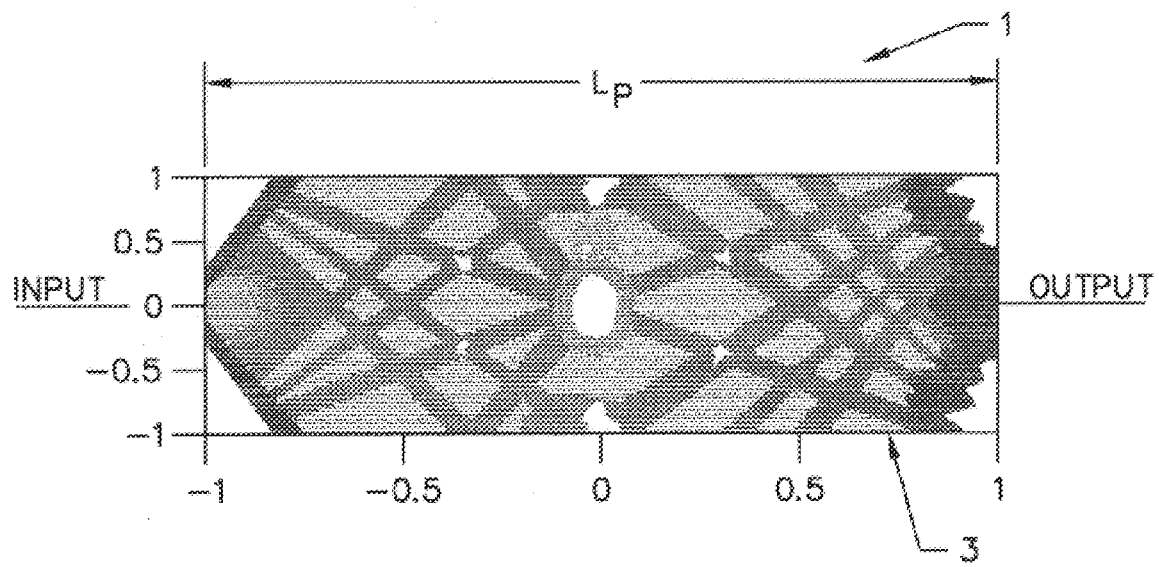
FIG. 1 is a top view of the field evolution through the multimode interference region of a 1-by-1 self-imaging device for p=1, with the brightness at any point proportional to the amplitude of the electric field at that point. This plot was generated from data produced by a computer program which models multimode interference devices.
Figure 2:
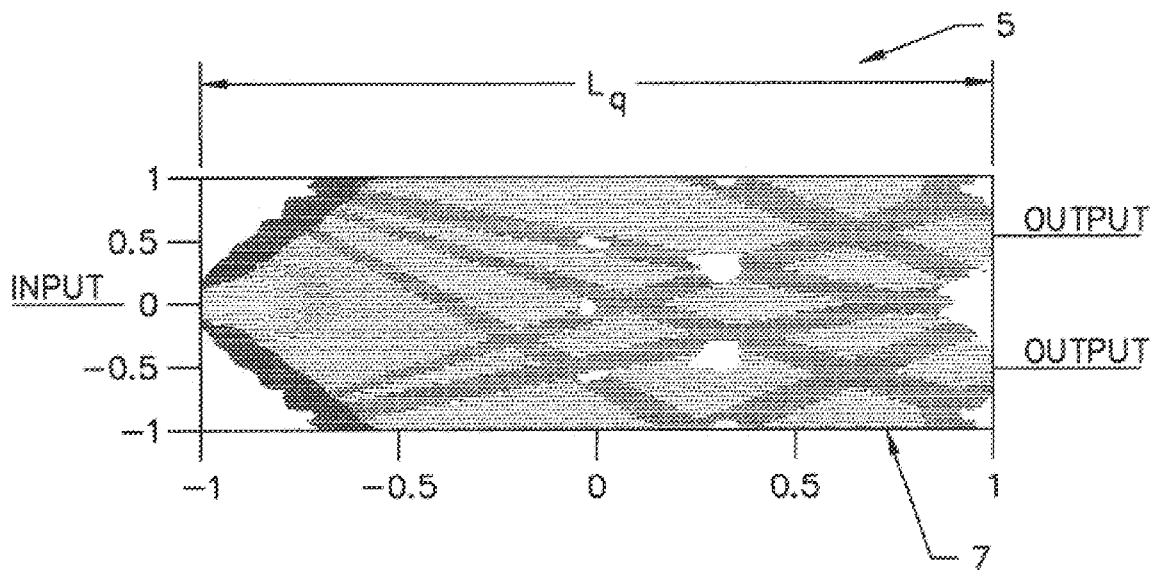
FIG. 2 is a top view of the field evolution through the multimode interference region of a 1-by-2 self-imaging device for q=1, with the brightness at any point proportional to the amplitude of the electric field at that point. This plot was generated from data produced by a computer program which models multimode interference devices.

The operation of splitter 10 can be explained as follows: the length $L_p$ of a center-fed 1-by-1 self-imaging device 1, as shown in FIG. 1, is given approximately by:

$$L_p = \frac{n_1(W_{eff})^2 p}{\lambda}$$

where $n_1$ is the effective index of refraction of the multimode interference (MMI) region 3 for a particular polarization mode, $W_{eff}$ is the effective width of MMI region 3, $\lambda$ is the wavelength (in vacuum) of the transmitted light, and p is any integer greater than zero. Similarly, the length $L_q$ of a center-fed 1-by-2 self-imaging device 5, shown in FIG. 2, is given approximately by:

$$L_q = \frac{n_2(W_{eff})^2 q}{2\lambda}$$

where $n_2$ is the effective index of refraction of multimode interference region 7 for light having the opposite polarization to that of device 1 and q is any integer greater than zero. Careful computer modeling of self-imaging devices 1 and 5 shows that they can be designed to have a significant depth-of-focus; i.e., good 1-by-N imaging can be obtained over a range of lengths. Using this knowledge, if $n_2$ is not too different from $n_1$, then it is possible to find a p and q such that $L_p$ and $L_q$ are equal to within their focal depths. This is the key to embodiment #1, as well as embodiment #2 (discussed below). The Self-Imaging Waveguide Optical Polarization Splitter 10 shown in FIG. 3 can thus be fabricated to act as a 1-by-1 self-imager for light having one polarization mode (TE or TM) and simultaneously as a 1-by-2 splitter for light having the other polarization mode. Note that only a single fabrication step is required, and that this technique is unrestricted. Performance for device 10 is also excellent; calculations for an unoptimized design for 1 μm light in y-cut lithium niobate show a length of about 9.5 mm, with crosstalk better than—21 dB and loss less than 0.4 dB. This is comparable to the best performance achieved by any type of waveguide polarization splitter. Length errors of up to 10 μm do not appreciably affect performance. One drawback, however, is that if $n_2$ is only very slightly different from $n_1$, then L becomes very long, and performance degrades as well. This design method for polarization separation is therefore practically restricted to birefringent materials such as lithium niobate, silica on silicon, or indium phosphide. Note that this device can be used in reverse to combine polarizations.

The architecture of embodiment #1 can also be used to separate or combine wavelengths. The reasoning, explanation and performance are similar to those just given except that the restriction to birefringent materials does not apply. Of particular importance is that the architecture of embodiment #1 can be used to separate/combine the commonly-used communications wavelengths of 1.3 μm and 1.55 μm.

EMBODIMENT #2

Embodiment #2, a simultaneous crossed and barred 1-by-1 off-center Self-Imaging Waveguide Optical Polarization Splitter 20 consists of an input waveguide 22 containing TE and TM polarized light; multimode interference region 24 aligned so that the refractive index for the TE polarized light is very different from the refractive index for the TM polarized light, and with the length $L_2$ set so that the light polarization mode experiencing the lower refractive index is bar self-imaged while the other light polarization mode is cross self-imaged; an output waveguide 26 containing the light polarization mode experiencing the higher refractive index, and an output waveguide 28 containing the other light polarization mode.

Figure 4:
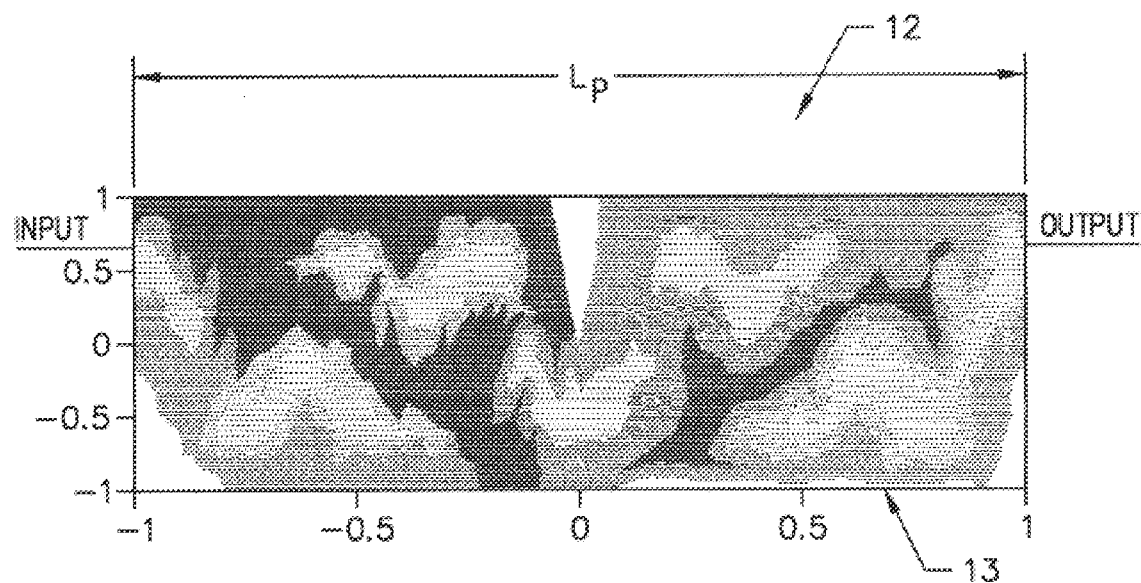
FIG. 4 is a top view of the field evolution through the multimode interference region of a barred 1-by-1 off-center self-imaging device for p=1, with the brightness at any point proportional to the amplitude of the electric field at that point. This plot was generated from data produced by a computer program which models multimode interference devices.
Figure 5:
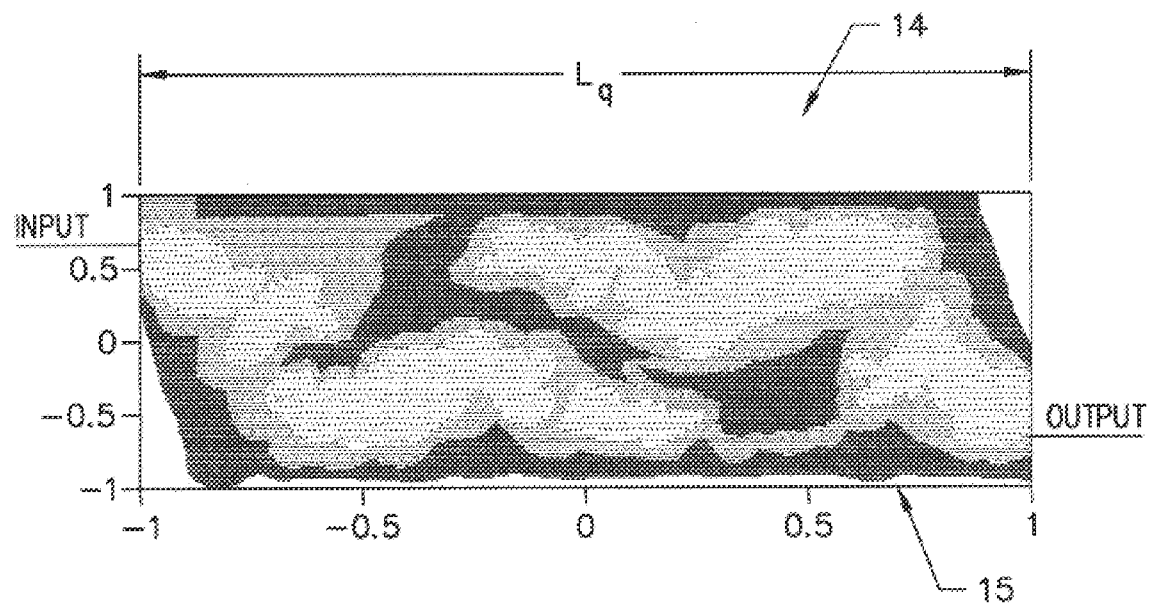
FIG. 5 is a top view of the field evolution through the multimode interference region of a crossed 1-by-1 off-center self-imaging device, for q=1, with the brightness at any point proportional to the amplitude of the electric field at that point. This plot was generated from data produced by a computer program which models multimode interference devices.

The operation of device 20 can be explained as follows: a 1-by-1 self-imaging device 12 with an off-center input and barred output (i.e., offset to the same side of MMI region 13 as the input) in shown in FIG. 4. The length $L_p$ of region 13 is given approximately by:

$$L_p = \frac{4n_1(W_{eff})^2(2p-1)}{\lambda}$$

where the symbols have the same meaning as in embodiment #1. Similarly, a 1-by-1 self-imaging device 14 with an off-center input and crossed output (i.e., offset to the opposite side of MMI region 15 as the input) is shown in FIG. 5. The length $L_q$ of region 15 is given approximately by:

$$L_q = \frac{8n_2(W_{eff})^2 q}{\lambda}$$

Figure 6:
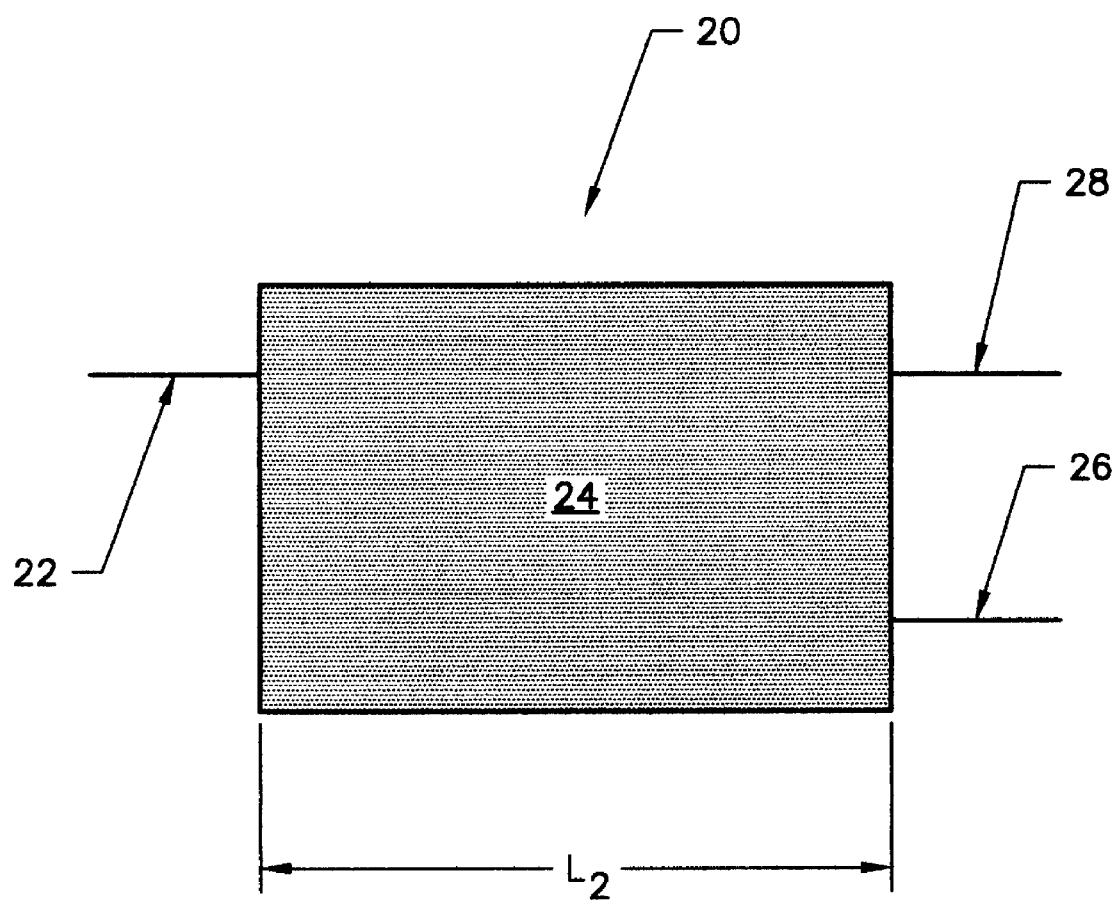
FIG. 6 is a schematic top view of embodiment #2 of my invention, a simultaneous crossed and barred 1-by-1 off-center self-imaging waveguide optical polarization splitter in which, in general, p and q1.

As in embodiment #1, if $n_2$ is not too different from $n_1$, then it is possible to find a p and q such that $L_p$ and $L_q$ are equal to within their focal depths. One thus obtains a Self-Imaging Waveguide Optical Polarization Splitter 20, as shown in FIG. 6, which acts as a barred 1-by-1 self-imager for light having one polarization mode (TE or TM) and simultaneously as a crossed 1-by-1 self-imager for light having the other polarization mode. Any fabrication method may be used, however, the practical restriction to birefringent materials still applies. Note that this device can be used in reverse to combine polarizations.

The architecture of embodiment #2 can also be used to separate or combine wavelengths. The reasoning, explanation and performance are similar to those just given except that the restriction to birefringent materials does not apply. Of particular importance is that the architecture of embodiment #2 can be used to separate/combine the commonly-used communications wavelengths of 1.3 $\mu$m and 1.55 $\mu$m.

EMBODIMENT #3

Figure 9:
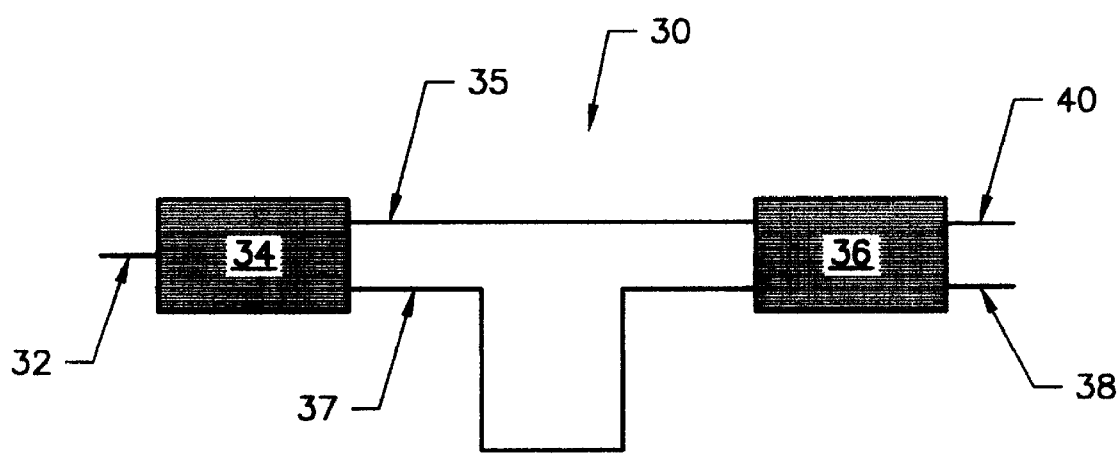
FIG. 9 is a schematic top view of embodiment #3 of my invention, an out-of-phase self-imaging waveguide optical polarization splitter.

Embodiment #3, shown in FIG. 9, is an out-of-phase Self-Imaging Waveguide Optical Polarization Splitter 30, and consists of input waveguide 32 containing TE and TM polarized light, a 1-by-2 polarization-independent self-imaging power splitter 34, an intermediate waveguide 35 of length $L_{par}$ containing TE and TM polarized light, an intermediate waveguide 37 of length $L_{par}+2*L_{perp}$ containing TE and TM polarized light, a 2-by-2 self-imaging coupler 36, an output waveguide 38 containing TE polarized light only, and an output waveguide 40 containing TM polarized light only.

Embodiment #3 begins by splitting the TE and TM polarized light in input waveguide 32 into two equal parts using a 1-by-2 self-imaging splitter 34, such as the one shown in FIG. 2, but designed to be polarization independent. The two parts then propagate through intermediate waveguides 35 and 37 and are then fed into a 2-by-2 self-imaging coupler 36.

Figure 7:
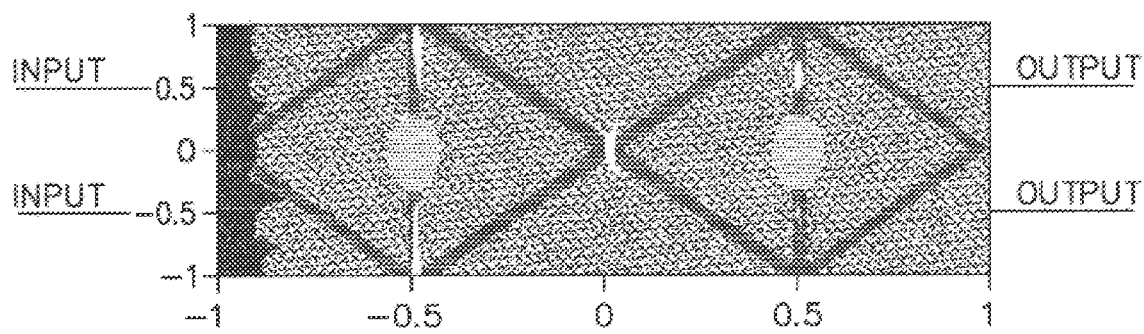
FIG. 7 is a top view of the field evolution through the multimode interference region of a 2-input self-imaging device in which the inputs are in phase, with the brightness at any point proportional to the amplitude of the electric field at that point. This plot was generated from data produced by a computer program which models multimode interference devices.
Figure 8:
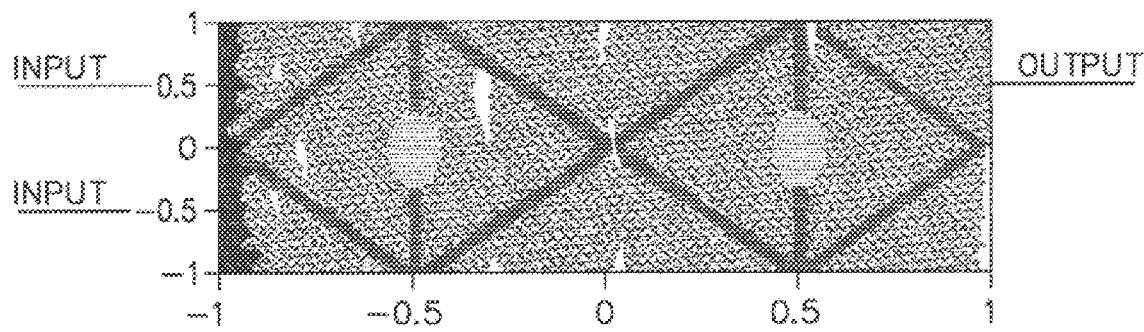
FIG. 8 is a top view of the field evolution through the multimode interference region of a 2-by-2 self-imaging device in which the inputs are 90 degrees out of phase, with the brightness at any point proportional to the amplitude of the electric field at that point. This plot was generated from data produced by a computer program which models multimode interference devices.

If the two parts were to arrive in phase at the input of coupler 36, then 2-by-2 self-imaging would occur, which would accomplish nothing, as shown in FIG. 7. Instead, intermediate waveguide 37 is made longer than intermediate waveguide 35 so that the two parts arrive with a phase difference of $(2p-1)\pi/2$. This results in off-center 2-by-1 self-imaging, as shown in FIG. 8, for which the parity of p determines the output waveguide. Polarization splitting is accomplished by using the birefringence of the intermediate waveguides 35 and 37 so that p is even for one polarization mode and odd for the other.

FIG. 9 schematically depicts an idealized architecture for embodiment #3; an actual device would have gradual curves in intermediate waveguide 37, not right angles as shown. In the case of a birefringent substrate, the refractive index is $n_1$ for TE modes and for TM modes propagating along the main axis of the device. The refractive index is $n_2$ for TM modes propagating perpendicular to the main axis of the device. Then at the inputs to 2-by-2 coupler 36, the phase differences will be:

$\Delta\phi_{TE}=4\pi n_1 L_{perp}/\lambda$
$\Delta\phi_{TM}=4\pi n_2 L_{perp}/\lambda$ and for polarization splitting we require:

$\Delta\phi_{TE}=(4p+1)\pi/2$
$\Delta\phi_{TM}=(4q+3)\pi/2$

Combining these four equations yields the requirement that integers p and q be found such that:

$$\left(\frac{4p+1}{4q+3}\right)=\frac{n_1}{n_2}$$

to a good approximation. The result can be used to find $L_{perp}$ using:

$$L_{perp}=\frac{(4p+1)\lambda}{8n_1}$$

Note that there is no restriction on $L_{par}$. As an example, for y-cut lithium niobate a 1 $\mu$m, $L_{par}$ obtains a value of 2.7 $\mu$m. An unoptimized design using a 40 $\mu$m wide 2-by-2 coupler show a length of about 12 mm, with crosstalk better than -32 dB and a loss of 0.5 dB. Narrower couplers give lower loss and shorter overall length but higher crosstalk, and vice versa for wider couplers.

A key difference between embodiment #3 and embodiments #1 and #2 is that embodiment #3 is more able to exploit the weak birefringence which occurs even for isotropic substrates, such as z-cut lithium niobate, gallium arsenide, glass, and polymer, due to the difference in boundary conditions for TE and TM modes. If the refractive index is $n_1$ for TE modes and $n_2$ for TM modes, regardless of propagation direction, then one again derives the equations above. $L_{perp}$ is longer but still reasonable. An added bonus is that the tolerances are also increased. The extraordinary performance numbers given above for y-cut lithium niobate still apply for z-cut lithium niobate, and similar performance can be obtained for gallium arsenide, glass, etc. As in embodiments #1 and #2, any fabrication method may be used. Note that this device can be used in reverse to combine polarizations.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

I claim:

1. A simultaneous 1-by-1 and 1-by-2 self-imaging waveguide integrated optical polarization splitter comprising:
    an input waveguide containing orthogonally polarized light of two modes;
    a multimode interference region having a refractive index, the multimode interference region aligned with said input waveguide such that the refractive index of the multimode interference region for said orthogonally polarized light is different for said two modes, with the length of said multimode interference region set such that the light polarization mode experiencing the lower refractive index in said region is singly self-imaged while the light having the other polarization mode is doubly self-imaged;
    a first output waveguide containing the light polarization mode experiencing the higher refractive index; and
    second and third output waveguides each containing half the power of the other light polarization mode.

2. The integrated optical polarization splitter of claim 1 wherein said two orthogonally polarized light modes are modes TE and TM.

3. The integrated optical polarization splitter of claim 2 wherein the multimode interference region of said splitter is made from a strongly uniaxial or biaxial material.

4. The integrated optical polarization splitter of claim 3 wherein said uniaxial or biaxial material is lithium niobate.

5. The integrated optical polarization splitter of claim 3 wherein said uniaxial or biaxial material is silica on silicon.

6. The integrated optical polarization splitter of claim 3 wherein said uniaxial or biaxial material is indium phosphide.

7. A simultaneous crossed and barred 1-by-1 off-center self-imaging waveguide integrated optical polarization splitter comprising:
    an input waveguide containing orthogonally polarized light of two modes;
    a multimode interference region having a refractive index, the multimode interference region aligned with said input waveguide such that the refractive index of the multimode interference region for said orthogonally polarized light is different for said two modes, with the length of said multimode interference region set such that the light polarization mode experiencing the lower refractive index in said region is bar self-imaged while the light having the other polarization mode is cross self-imaged;
    a first output waveguide containing the light polarization mode experiencing the higher refractive index in said region; and
    a second output waveguide containing the other light polarization mode.

8. The integrated optical polarization splitter of claim 7 wherein said two orthogonally polarized light modes are modes TE and TM.

9. The integrated optical polarization splitter of claim 8 wherein the multimode interference region of said splitter is made from a strongly uniaxial or biaxial material.

10. The integrated optical polarization splitter of claim 9 wherein said uniaxial or biaxial material is lithium niobate.

11. The integrated optical polarization splitter of claim 9 wherein said uniaxial or biaxial material is silica on silicon.

12. The integrated optical polarization splitter of claim 9 wherein said uniaxial or biaxial material is indium phosphide.

13. An out-of-phase self-imaging waveguide integrated optical polarization splitter comprising:
    an input waveguide containing orthogonal polarized light of two modes;
    a 1-by-2 polarization-independent self-imaging power splitter;
    a first intermediate waveguide containing said two mode polarized light;
    a second intermediate waveguide longer than said first intermediate waveguide containing said two mode polarized light;
    a 2-by-2 self-imaging coupler having said first and said second intermediate waveguides as inputs;
    a first output waveguide containing one mode polarized light only; and
    a second output waveguide containing the other mode polarized light only.

14. The integrated optical polarization splitter of claim 9 wherein said two orthogonally polarized light modes are modes TE and TM.

* * * * *